United States Patent [19]

Millar et al.

[11] 4,308,755
[45] Jan. 5, 1982

[54] LIQUID VOLUMETRIC FLOWMETER

[76] Inventors: Robert J. Millar, 2 Briarroot Dr., Smithtown, N.Y. 11787; Charles E. Stapleton, 82 Skyline Dr., Coram, N.Y. 11727; John M. Hauf, 7 Regal Ct., St. James, N.Y. 11780

[21] Appl. No.: 51,981

[22] Filed: Jun. 25, 1979

[51] Int. Cl.[3] ............................................. G01F 1/115
[52] U.S. Cl. ................................ 73/861.77; 73/861.79
[58] Field of Search .......... 73/861.77, 861.78, 861.79, 73/861.89; 335/205; 364/510, 92 FL, 92 DM, 92 FQ

[56] References Cited

U.S. PATENT DOCUMENTS

| | | | |
|---|---|---|---|
| 1,483,225 | 2/1924 | Hammett | 73/861.92 |
| 1,511,765 | 10/1924 | Latham | 73/861.92 |
| 2,600,011 | 6/1952 | MacDonald et al. | 335/205 |
| 3,069,907 | 12/1962 | Eddy | 73/861.77 |
| 3,616,039 | 10/1971 | Althouse et al. | 73/861.77 |
| 3,686,947 | 8/1972 | Maeshiba | 73/861.92 |
| 3,739,276 | 6/1973 | Dornberger | 235/92 |
| 3,910,115 | 10/1975 | Bonner | 73/861.92 |
| 3,991,303 | 11/1976 | Siegel | 364/510 |
| 4,051,998 | 10/1977 | Zabel | 235/92 |
| 4,114,446 | 9/1978 | Stapler | 73/861.92 |
| 4,134,298 | 1/1979 | Guthrie | 73/861.92 |

Primary Examiner—Herbert Goldstein
Attorney, Agent, or Firm—Stephen E. Feldman; Marvin Feldman

[57] ABSTRACT

A liquid volumetric flow measuring apparatus is disclosed wherein a turbine or vane, flow straighteners therefor, and a rotating shaft mounted therewith, and a magnetic sender are all mounted as an integral unit in a U-shaped pipe trap, and a volumetric calculator is mounted in conjunction therewith. By a specific mounting of the turbine in the trap there is a dampening action causing the calculator to cease recording the flow immediately upon this stopping of the motion of the liquid through the trap. This construction provides a guard against any air which is pumped through the pipe being recorded as liquid in contradistinction to a gaseous fluid. The magnetic sender has a reed switch and a magnet which are specifically mounted so as to provide low angular momentum and reliability, at both high and low flow rates. The present invention is particularly useful in fuel delivery, wherein the liquid volumetric flowmeter is mounted within the system of the party to whom the fuel is delivered, and permits the party to accurately record the liquid fuel actually delivered, and to guard against being charged for air flow from the fuel supplier's pump.

14 Claims, 6 Drawing Figures

{ 4,308,755 }

LIQUID VOLUMETRIC FLOWMETER

FIELD OF THE INVENTION

This invention relates to liquid volumetric flowmeters, specifically this invention relates to liquid volumetric flowmeters for accurate liquid flow measurement.

BACKGROUND OF THE INVENTION

It is common knowledge that there are numerous errors in the delivery of fuel oil to the consumer resulting in a substantial financial loss, particularly so now that the price of petroleum products has substantially increased. The common source of these errors is to switch pumping fuel from one compartment of the delivery truck to an empty compartment wherein through continued angular momentum there is false register of a liquid flow.

In prior art flowmeters, the inaccuracy in most of the meters, revolve around the angular momentum of the rotating shaft. The angular momentum of the rotating shaft causes the meter to register even after the liquid has ceased to flow. The prior art flowmeters were also difficult to mount and often required special mounting features. In addition, errors in the true amount of liquid flow were introduced by perturbations in the liquid emanating from eddy currents at the pipe wall and within the conduit itself. This is so in one sense since the velocity of the fluid passing along the walls of the pipe is significantly lower than the velocity passing in the center, a non-linear measurement resulted due to changing flow rates.

In U.S. Pat. No. 3,686,947, granted Aug. 29, 1972, to Maeshba, there is disclosed a liquid measuring device wherein moving vanes are disposed within a U-shaped conduit. Such device required special mounting and was subject to errors in liquid volumetric measurements as aforesaid.

The present invention in one aspect seeks to resolve the problem of angular momentum. First, the rotating shaft and vane are placed in the substantially vertical portion of a U-shaped pipe, on the outlet side. In this manner, liquid will always be surrounding the turbine vane and necessarily dampens the spinning of the vane when the flow of the liquid ceases. Additionally, the present invention seeks to reduce the angular momentum by limiting the radial size and mass of the transducer.

Additional sources of error in the prior art were due to magnetic switching being error prone at different flow rates.

Therefore, it is an object of the present invention to provide a liquid volumetric measuring apparatus which substantially obviates one or more of the aforesaid limitations and disadvantages in the prior art.

It is a principal object of this invention to provide a liquid volumetric flowmeter wherein the liquid flow is accurately measured while precluding false measurement of the gaseous flow.

It is another object of the invention to provide an apparatus as aforesaid wherein the liquid is accurately measured, which apparatus is of an integral construction.

It is another object of the invention to provide a liquid volumetric flowmeter as aforesaid which need not be calibrated for each different trap in which it is to be installed.

It is another object of the present invention to provide the consumer with a method to inexpensively verify the amount of fuel that was allegedly pumped into his tank.

It is a further object of the present invention to provide a liquid volumetric measuring apparatus, having motive flow detecting elements continuously immersed in the liquid to be measured, and prevent erroneous measurements by prohibiting the measurement of air flow, and wherein the measuring elements are stopped upon the cessation of the flow of liquid through the trap.

It is a further object of the present invention to provide a magnetic sender which operates accurately at low and high flow rates.

It is still a further object of the present invention to provide an electrical means of calculating the volumetric flow with a high degree of accuracy at a relatively low cost of manufacture.

It is still a further object of the present invention to provide a novel battery status indicator.

SUMMARY OF THE INVENTION

Accordingly, there has been provided a liquid volumetric flow measuring apparatus comprising in a broad sense means to (1) discriminate liquid flow measurement from gas flow, and (2) accurately measure the liquid flow. And in a more specific sense, comprises a turbine or vane, flow straighteners a rotating shaft, a magnetic sender all mounted as an integral unit in a U-shaped pipe trap; and a calculator. Specific mounting of the turbine in the trap provides for the dampening of the turbine which in turn causes the apparatus to cease recording the flow immediately upon this stopping of the motion of the liquid through the trap. This provides a guard against air being recorded as liquid. The magnetic sender is comprised of a reed switch and a magnet which are mounted in a specifically designed manner so as to provode low angular momentum and reliability at both high and low liquid flow rates. A calculator is provides which is extremely accurate at both low and high flow rates, and is in cooperative relationship to the magnetic sender. A battery status indicator is also provided.

DESCRIPTION OF THE PREFERRED EMBODIMENT

Figure 1:
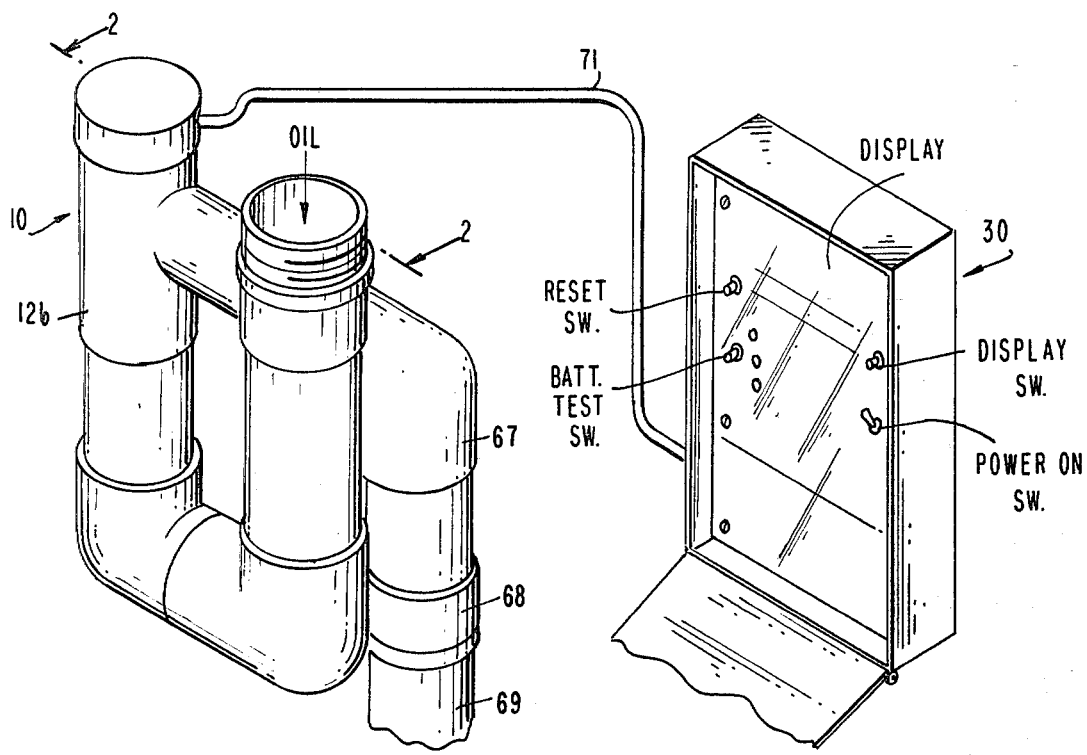
FIG. 1 is a perspective view of the liquid volumetric flowmeter as installed.
Figure 2:
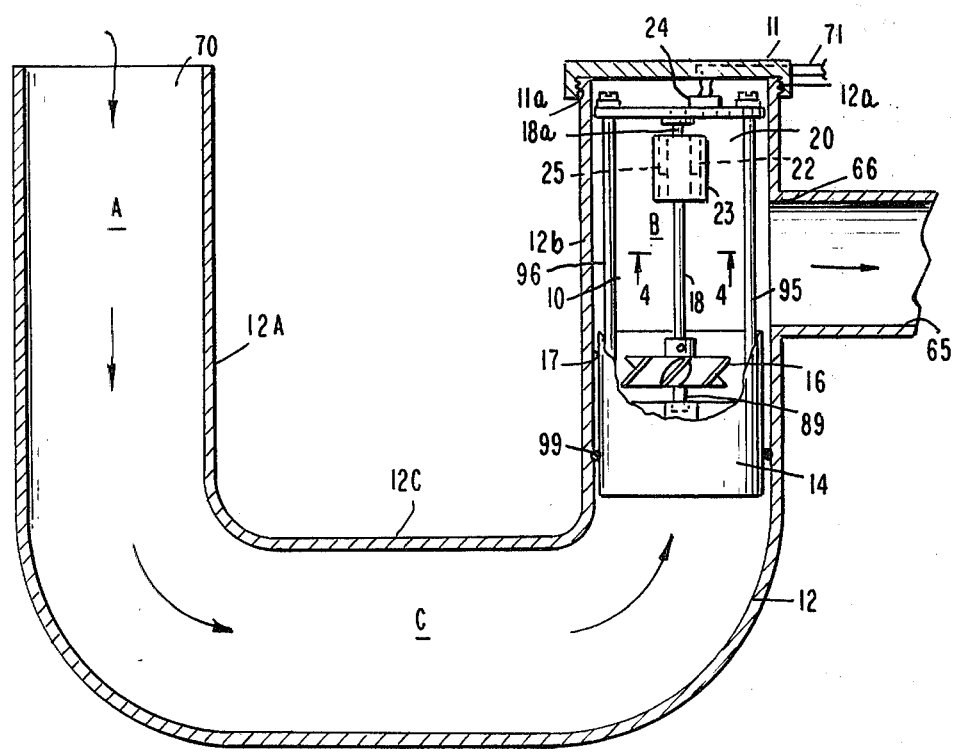
FIG. 2 is a sectional view of the apparatus of the present invention.
Figure 3:
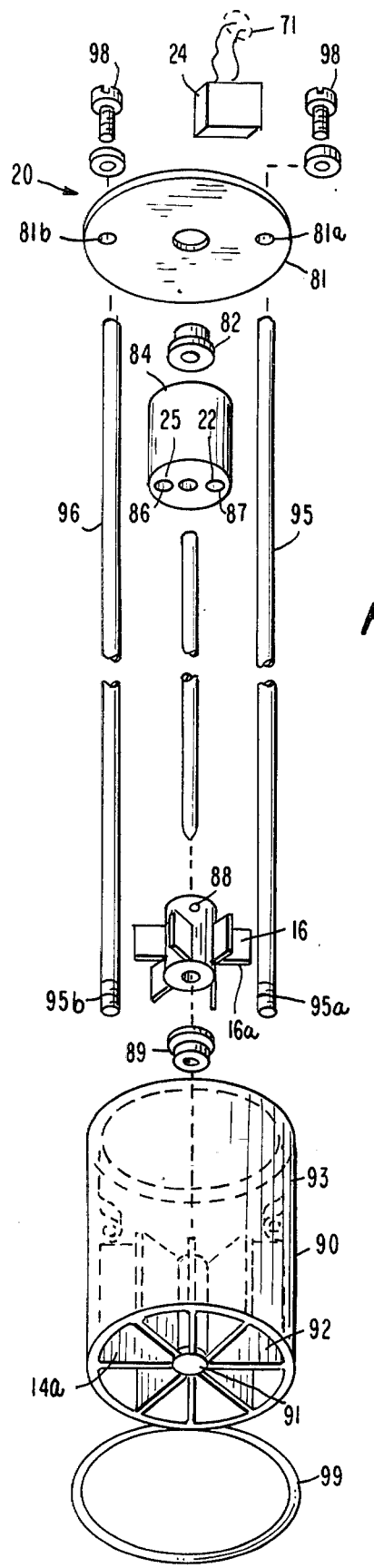
FIG. 3 is an enlarged expolded view of the integral unit removed from the apparatus of FIG. 2.
Figure 5:
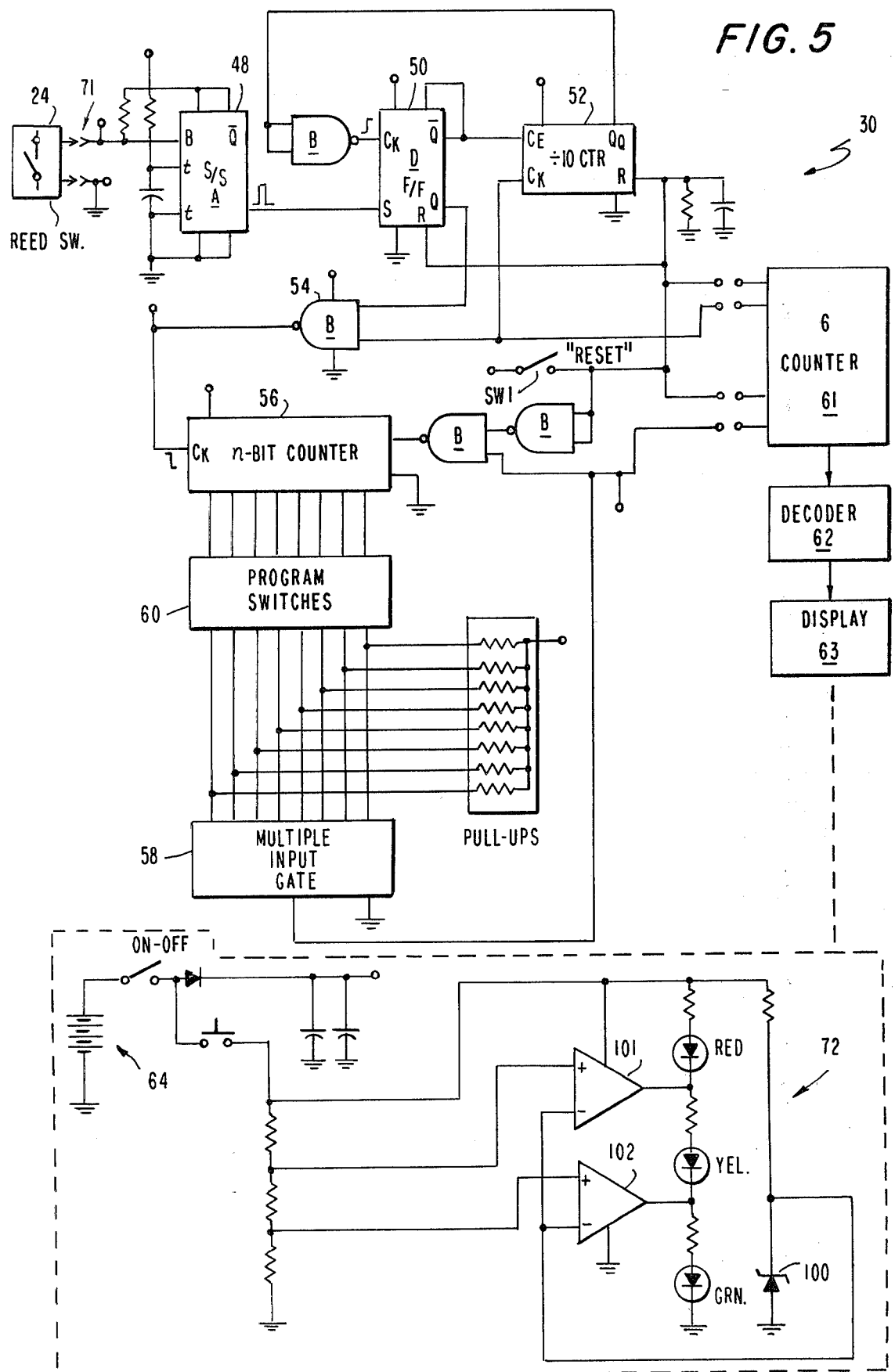
FIG. 5 is a schematic of the electronics of the device.
Figure 6:
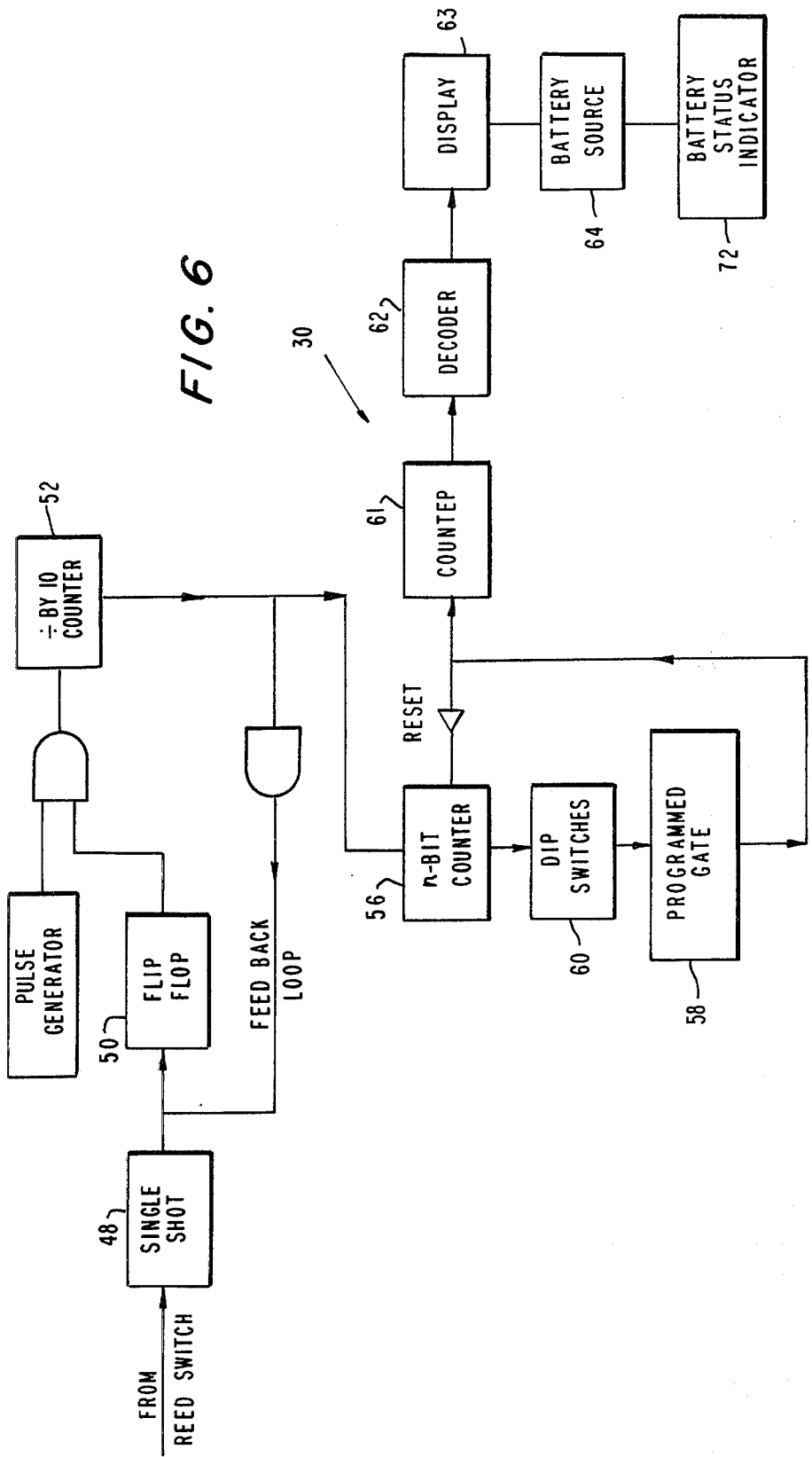
FIG. 6 is a block diagram of the calculating process of the electronics disclosed in the preceding FIG. 5.

Referring to FIGS. 1-3, the liquid measuring apparatus of the present invention is shown and comprises an integral unit, generally referred to as numeral 10, which is uprightly mounted within the downstream section 12b of U-shaped conduit or trap 12. In a broad sense unit 10 comprises liquid flow straighteners 14, a turbine or vane 16, a rotatable shaft 18 on which vane 16 is mounted, and a magnetic sender 20. The magnetic sender 20 is in turn electrically interconnected to a calculator generally designated as numeral 30 (FIGS. 5 and 6).

Unit 10 is formed with a cap or cover 11 which is formed with screw threads 11a which interengage threads 12a of leg 12b of conduit 12. Unit 10, with the aforesaid elements integral therein, may thus be readily assembled and disassembled with the conduit 12.

Conduit 12 is formed of a first vertical leg 12a forming upstream section A, and intermediate leg 12c forming section C, and a downstream leg 12b forming section B. An outlet conduit 65 is integrally formed to leg 12b as at 66. Conduit 65 is also formed with an elbow 67 which interconnects with the end 68 of conventional fuel feed pipe 69. Leg 12a is formed with an inlet orifice 70. In this manner of construction, liquid fuel oil enters inlet 70 of U-shaped conduit 12, passes through sections A, B, and upward through C, at which time the liquid actuated flowmeter 10, and passes through conduit 65 to pipe 69 and then into a conventional storage tank (not shown).

Unit 10, the construction and operation of which will be fully explained hereafter, operates in a sense as a transducer to provide an electric signal, and is interconnected by cable 71 to display assembly 30. Display assembly 30 comprises a multiplier 50, 52, 54, a counter 61, decoder 62, read-out display 63, a battery source 64, and a battery status indicator 72.

The magnetic sender 20 consists of the magnet 22, reed switch 24 at one end of the rotating shaft 18. Referring to FIG. 2, the magnet 22 is connected to the rotating shaft 18 through a connecting member 23 and a counter-balance 25 is placed opposite the magnet 22 in the connecting member 23.

Referring to FIGS. 1–2, the fuel enters the system at section A, flows into the U-shaped pipe, through the ducts 14a of the liquid flow straighteners 14, then turning the vane 16 mounted on the rotating shaft 18, and then proceeds to the outlet 65 into the storage tank (not shown).

Referring to FIG. 2, it was determined empirically that if the diameter of the vane 16 was substantially less than the inside pipe diameter 17, then the vane 16 remained in that portion of the moving liquid whose velocity increased linearly with the volumetric flow rate. In a working model of the invention the vane 16 diameter was reduced to approximately ½ the inside diameter of the pipe.

Referring to FIG. 2, there is shown the positioning of the magnet 22 in relation to the end 18a of the rotating shaft 18 and reed switch 24. The purpose for this specific juxtaposition of elements is to provide for the magnet 22 to pass under the reed switch 24 and therefore enables the reed switch 24 to remain in the magnetic field of the magnet 22 for a greater percentage of each singular turn of the rotor shaft 18. In one working model of the invention, a cylindrical magnet, 0.125 inches in diameter and one inch in length, was mounted parallel to the turbine shaft. The reed switch 24 was then mounted perpendicular to both the shaft and the magnet just above where the magnet was mounted to the shaft. It was demonstrated that the reed switch 24 was in the magnetic field for almost ½ (i.e. 180°) of each shaft turn. The magnet 22 was mounted as close to the shaft 18 as possible and since this necessarily reduces the angular momentum of the shaft to its minimum. By this manner of construction, the amount of damping necessary to bring the rotating turbine 16 to a stop is reduced.

Figure 4:
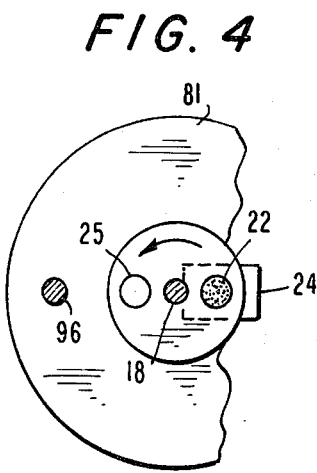
FIG. 4 is a sectional view taken along line 4—4 of FIG. 3.

Unit 10, in a more specific sense, comprises a plural mounting of elements on shaft 18. Shaft 18 is rotatably mounted in end plate 81 by Teflon washer 82. Holder 84 is formed with axial hole 85 which slidably received shaft 18 and is held in place by a set screw (not shown). Holder 84 is formed with two equally, radially disposed holes 86 and 87 for holding cylindrical magnet 22 and counter balance 25, respectively, so that with rotation of shaft 18, magnet 22 revolves in a balanced manner. Reed switch 24 is mounted on plate 81 so as to be above the circumferential path of magnet 22 (See FIG. 4).

The turbine 16 is fixedly mounted on shaft 18 by set screw 88, and rotates freely in Teflon washer 89. Turbine 16 is preferably of integral moulded plastic (e.g. diallyl phthalate) construction.

Flow straightener 14 comprises a cylindrical outer shroud 90, with a central hub 91 and six equi-angularly spaced, radially disposed vanes 92 (typical). The upper end 92a of the vanes is formed with diametric through holes 93 and 94, for receiving ends 95a, 96a, of rods 95 and 96, respectively so as to fixedly hold straightener 14 in place. Ends 95b, 96b of rods 95, 96 are fixedly mounted in holes 81a and 81b of plate 81 by screw assemblies 98. Straightener 14 is thus fixedly, non-rotatably mounted with respect to shaft 18. An O-ring gasket 99 seals the assembly and insures directed flow through vanes 92. In the preferred aspect of the invention the vane or turbine 16 is disposed within the cylindrical shroud 90 so that the turbine 16 is rotated within a standardized environment. Thus, the shroud 90 provides a standard diameter to minimize or eliminate the necessity for calibrating each individual unit 10 being installed in different pipe sizes.

In this manner of construction, the liquid passes through vanes 92 of flow straightener 14 which evens the flow path of the liquid to contact blades 16a and cause rotation of turbine 16 and shaft 18, and in turn magnet 22, which accurately activates reed switch 24.

As the liquid enters into section A of the trap 12 is proceeds through the turbine 16, causing rotation of the shaft 18 to which is mounted washer 82. Each shaft rotation causes the magnet to pass under the reed switch 24, which in turn causes the switch 24 to close, making an electrical contact and transmitting a signal through cable 71. When the liquid ceases to flow through the trap 12, the trap 12 will remain full with the liquid at rest. This means that the turbine 16 is continuously immersed in the liquid to be measured. Therefore, the turbine blades 16a are never permitted to continue to turn by angular momentum, and is dampened by the liquid caught in the trap 12. Should air be pumped into A, the gravity of the liquid caught in the trap 12 will cause the liquid to remain in the trap 12 and the turbine blades 16a will remain stationary. Only the passing of a liquid, in contradistinction to a gas, will cause the blades to rotate.

A connecting cable 71 from the reed switch 24 applies the switch closures to the input of a single-shot 48. One reed switch 24 closure generates one pulse of the output of the single shot 48 which sets the flip-flop 50. The flip-flop 50 in this set position enables a clock input of a divide-by-ten counter 52 driven by a free running oscillator (part of 61). Therefore, for each switch closure 10, pulses are generated at the output of the divide-by-ten counter 52. The significance of this will be further explained hereinafter.

The output of the divide-by-ten counter 52 and a gate 54 form a feed-back loop which resets the flip-flop 50. The 10 generated pulses are then stored in a n-bit counter (e.g. 8-bit) counter 56. The output of this n-bit counter is then applied through programming DIP switches to a multiple input gate 58. This programmed gate 58 has a preset number corresponding to the amount of pulses required in the n-bit counter 56 to represent one gallon of fluid. Each time there is a reed switch 24 closure 10 additional pulses are stored in the counter 56. As soon as the preset value has been achieved in the n-bit counter 56, the programmed gate 58 loads a single pulse in an additional counter and the same pulse resets the n-bit counter 56 to zero. This reset pulse is very short and allows for the continuing flow of pulses from the divide-by-ten counter 52 to continue uninterrupted in loading additional pulses to the n-bit counter 56.

The pulses generated by the programmed gate, which represent the units of measure (for example, gallons) is loaded in additional counters, decoders, and then displayed upon demand.

The significance of loading ten pulses into the n-bit counter 56 for every single closure of the reed switch 24 must now be explained. In the preferred embodiment of the invention, a six digit number is displayed. This six digit number may be in whole gallons or liters and tenths of gallons or liter units. The accuracy of 0.25% plus or minus one gallon is achieved in the following manner: Suppose that it was determined that 204 pulses were developed at the output of the divide-by-ten counter 52, for each ten gallons of fuel that pass through the system. Therefore, the reed switch 24 would have closed 20.4 times for each gallon of fluid that passed. Since a fraction of a reed switch 24 closing is impossible, a way had to be developed to carry a fraction of a gallon while the next full gallon was measured digitally. This is the function of the multiplier 50, 52, 54 and the n-bit counter 52. In our example, the programmed gate 58 would be binary coded for 204 pulses. When the n-bit counter 56 achieved loading 204 bits, the output of the programmed gate 58 would load one pulse into additional counters representing gallons of fluid measured. It is obvious, however, that 204 pulses can be stored in the n-bit counter 56, the reed switch 24 must have opened and closed 21 times. Twenty-one closures, however, resulted in 210 pulses being generated. Therefore, after the programmed value had been received, the pulse that is generated by the programmed gate 58 resets the n-bit counter 56 to zero. However, this pulse is extremely short so that the six additional pulses from the divide by ten counter 52 are not lost but carried into the 8-bit counter 56. In this manner, fractions of a gallon are accumulated and not lost in the measuring process. The maximum error can only be a fraction of one gallon.

In our example, 21 reed switch 24 closures were necessary to register one gallon. The error is then computed $$\frac{(1-20.4)}{(21)} \times 100 = 2.86\%$$

for the first gallon received.
Examining the following table demonstrates how the carried pulses result in correcting the error to zero every five gallons.

| Gal. | Pulses from Switch | (Pulses) (× 10) | + | (From) (Carry) | − | (Decode) (Number) | = | Carry |
|---|---|---|---|---|---|---|---|---|
| 1 | 21 | 210 | + | 0 | − | 204 | = | 6 |
| 2 | 20 | 200 | + | 6 | − | 204 | = | 2 |
| 3 | 21 | 210 | + | 2 | − | 204 | = | 8 |
| 4 | 20 | 200 | + | 8 | − | 204 | = | 4 |
| 5 | 20 | 200 | + | 4 | − | 204 | = | 0 |

The following fractions of a turn of the sender requires the indicated number of gallons to correct the error to zero.

| Fraction of turn | Number of Gals. To Correct |
|---|---|
| 0.1 | 10 Gallons |
| 0.2 | 5 Gallons |
| 0.3 | 10 Gallons |
| 0.4 | 5 Gallons |
| 0.5 | 2 Gallons |
| 0.6 | 5 Gallons |
| 0.7 | 10 Gallons |
| 0.8 | 5 Gallons |
| 0.9 | 10 Gallons |

It can be seen from the above that the error is nonaccumulative and corrects itself every few gallons. At any one time, the electronics never make an error beyond a few percent of one gallon, nonaccumulative.

In a preferred embodiment, the electronics are battery-powered. A novel battery status indicator may also be provided. This indicator provides the monitoring of three different voltage levels to provide a warning level before the battery has reached the point where the electronics are inoperable. As seen from the circuitry diagram in FIG. 5 an inexpensive dual operational amplifier is used as a dual comparator to sense the elvels of battery voltage compared to the reference source which in the case of the preferred embodiment is a Zenor diode 100. When the battery voltage is applied, by closing the "battery test" switch, only one light emitting diode (LED) will turn on. If the batteries are frech, the voltage provides to the dual comparators 101 and 102 will be greater than that of the Zenor reference. The outputs of both comparators will therefore, be a high causing only the green light emitting diode to light. As the battery falls below 85% of its value, the voltage into comparator 101 will be less than that of the Zenor reference, however, the voltage into comparator 102 shall still remain high causing only the yellow light emitting diode to light. As the battery voltage decreases to 75% of its value the voltage at both comparators 101 and 102 will be lower than the Zenor reference causing only the red light emitting diode to light.

Thus, there is shown in the present invention that by keeping the turbine vanes continuously submerged in a fluid while a reed switch is placed relative to the magnetic field the source of errors in measurement have been substantially eliminated. The present invention further removes this source of error by reducing the size of the vane to be within the flow of the fluid whose velocity remains linear with respect to the increase of volumetric liquid flow. The present liquid measuring apparatus also accurately and inexpensively calculates the liquid flow volume.

While the invention has the ability to measure the flow of many different types of liquids, it is especially designed for the measurement of fuel oil being pumped into a tank from outside sources, for example, a delivery truck to a storage tank.

While there has been described what is at present considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A liquid flow measuring apparatus comprising:
   means to mount said apparatus as an integral unit in the vertically upwardly discharge leg of a U-shaped conduit;
   a shaft, being rotatably mounted on said mounting means;
   means disposed at one end of the shaft to permit rotation thereof;
   a vane mounted to the other end of said shaft, wherein means are mounted adjacent the other end of said shaft to straighten the liquid flow;
   magnetic means comprising a magnet mounted adjacent said shaft, wherein the magnet is cylindrical and wherein the magnet cylindrical axis is mounted parallel to the axis of the shaft at a distance adjacent the shaft; and
   a reed switch spacedly disposed from said magnet and operatively associated therewith, whereby each rotation of the shaft passes the cylindrical axis of the magnet in revolution within the transverse plane of the reed switch allowing the reed switch to be in the magnetic field for a substantial part of each shaft rotation by the liquid flow imparting rotation to said vane and shaft.

2. The apparatus of claim 1, further comprising a U-shaped conduit comprising means to receive said mounting means disposed at one end of one leg of said U.

3. The apparatus of claim 2, wherein said U-shaped conduit further comprises an outlet orifice disposed between the said end of said U and the vane.

4. The apparatus of claim 2 wherein means are mounted adjacent the other end of said shaft to straighten the liquid flow, and being disposed adjacent the other end of said shaft.

5. The apparatus of claim 4, wherein the diameter of the vane is substantially less than the inside diameter of the conduit.

6. The apparatus of claim 5, wherein said diameter of the vane is less than the maximum transverse dimension of the flow straightening means.

7. The apparatus of claim 4, said means to straighten said shaft comprising a shroud, said vane being disposed within said shroud.

8. The apparatus of claim 7, said shroud being cylindrical and being coaxial with said vane.

9. The apparatus of claim 1, further comprising;
   switching means to conduct electricity for a percentage of each rotation of the rotating shaft;
   electronic calculating means comprising a means for producing one pulse per switch closing;
   a divide-by-specific number counter for producing a specific number of pulses for each switch closure;
   a storage means for counting the multiplied pulses; and
   a programmable gate to generate a single pulse for a predetermined number of multiplied pulses representing a unit of volume, are carried over to the counting of the next unit of volume.

10. The apparatus of claim 9, said counter being a divide-by-ten counter.

11. The apparatus of claim 9, further comprising battery means to operate said calculator.

12. The apparatus of claim 11, further comprising battery status indicator means operating attached to said battery means, said status indicator means comprising a three-light indication display.

13. The apparatus of claim 1, said magnetic means comprising a cylindrical body formed with diametrically opposed through holes having axes parallel to the shaft axis, and said magnet being disposed in one hole, and an element being mounted in the other hole to counter balance the magnet.

14. The apparatus of claim 1, said magnet being more radially inwardly disposed to said shaft axis than the radius of said vane, and wherein the diameter of the vane is substantially less than diameter of the conduit.

* * * * *